C. G. HORNUNG.
PUNCTURE CLOSING DEVICE.
APPLICATION FILED FEB. 27, 1911.

1,057,241.

Patented Mar. 25, 1913.

Witnesses:

Inventor:
Charles G. Hornung,
By Wilhelm, Parker & Ward,
Attorneys:

UNITED STATES PATENT OFFICE.

CHARLES G. HORNUNG, OF BUFFALO, NEW YORK, ASSIGNOR TO CINCH REPAIR KIT COMPANY, OF LOCKPORT, NEW YORK.

PUNCTURE-CLOSING DEVICE.

1,057,241.  Specification of Letters Patent.  Patented Mar. 25, 1913.

Application filed February 27, 1911. Serial No. 611,018.

*To all whom it may concern:*

Be it known that I, CHARLES G. HORNUNG, a citizen of the United States, residing at Buffalo, in the county of Erie and State of New York, have invented a new and useful Improvement in Puncture-Closing Devices, of which the following is a specification.

This invention relates to improvements in that type of puncture closing devices for pneumatic tires, tubing, and similar articles, which are adapted to be inserted in the hole or puncture and consists of two heads or disks connected by a shank or body which is adapted to be shortened by pressure to cause the heads or disks to bear against the opposite faces of and to grip the tire or other article around the hole or puncture and thus effect an air-tight closure of the hole. In puncture closing devices of this kind as heretofore used, the shank or body is generally made separate from the heads or disks and riveted or brazed thereto, which involves a large amount of labor and also considerable skill. In brazing the heads to the shanks, there is considerable difficulty in securing them in their proper positions on the shanks, with the result that in many instances the disks are not parallel to each other or are not concentric, and when pressed into engagement with the opposite faces of the tube or other article, produce an imperfect closure. In the devices in which the heads or disks are riveted to the shanks, there is less liability of the heads being improperly secured to the shanks, but the shanks are very small and must be made by special machinery if they are to be produced economically and accurately, and furthermore, the operation of assembling and securing the parts together is more or less slow and tedious.

The objects of this invention are to provide a closing device in which the shank or body is formed integral with one of the heads or disks so that the device consists merely of two parts which can be readily assembled and connected; also to produce a closing device which can be accurately and expeditiously made without the use of skilled labor, which can be properly secured on a tire or other article without undue exertion, and which, when in place on the tire or article, will insure a perfect air-tight closure of the puncture.

Figure 1:
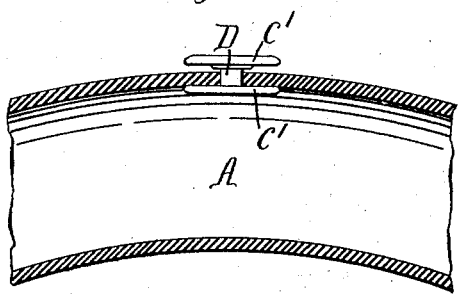
Figure 2:
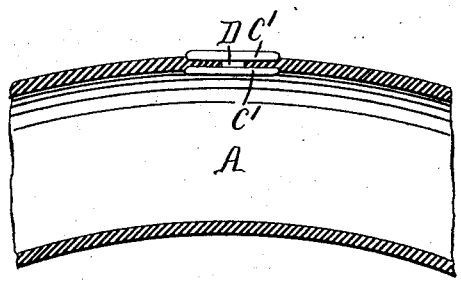
Figure 3:
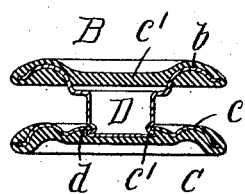
Figure 4:
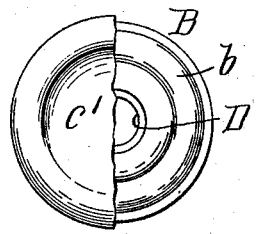
Figure 5:
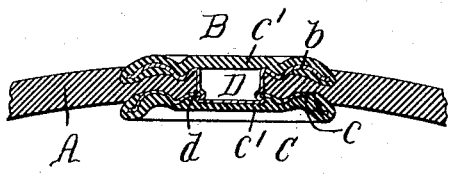
Figure 6:
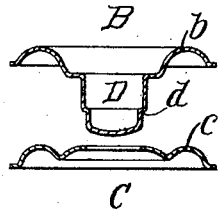

In the accompanying drawings: Figure 1 is an elevation of a puncture closing device embodying the invention, loosely placed in a hole or puncture in a tube or other article. Fig. 2 is a similar view, showing the device secured in place and closing the hole. Fig. 3 is an enlarged transverse section of the puncture closing device. Fig. 4 is a plan view thereof with the rubber covering of the device partly removed to expose the disk. Fig. 5 is an enlarged section of the device in place, closing a hole in a tire or other article. Fig. 6 is a transverse sectional elevation of the two parts comprising the device before being secured together and without the rubber covering.

Like reference characters refer to like parts in the several figures.

A represents a portion of a pneumatic wheel tire, tube, hose, or other article having a hole which it is required to close. The puncture closing device comprises opposite circular heads or disks B and C connected by a central hollow shank or body D, which is formed integral with one of the disks, B, and to the end of which the other disk, C, is secured. The heads or disks are preferably, as usual, provided with annular corrugations or beads $b$ and $c$ arranged opposite to each other so that the beads $c$ on one head or disk C are adapted to force the portions of the tire or article on which they bear into the corrugations $b$ of the other head or disk B to firmly grip the tire or article around the puncture, and the heads or disks are preferably covered with rubber, or other suitable yielding or elastic material $c'$, which assists in producing a tight closure of the hole or puncture and prevents the closure device from cutting or injuring the tire or article.

The shank or body D is formed by an integral hollow boss or portion which projects centrally from one side of the head or disk B and is preferably provided with a closed or imperforate outer end which is riveted in a central hole in the other disk or head C. The outer end of the shank or body D is preferably reduced, thereby forming a shoulder $d$ against which the disk C is rigidly held by the riveted end of the shank or body.

The middle portion of the head or disk B, in the construction shown, is provided with a shoulder which surrounds and is concentric with the base or inner end of the shank or body D and which extends substantially perpendicularly to the walls of the shank or body D.

In securing this closing device on the tire or article, one of the heads is first inserted through the hole, as shown in Fig. 1. Pressure is then applied to the opposite heads or disks by means of a suitable tool to press them toward each other so as to firmly grip or clamp the wall of the tire or article around the hole or puncture, as shown in Figs. 2 and 5. The pressure on the heads or disks causes the shoulder $d$ of the disk B to bend or fold downwardly around the attached open end of the shank or body and this open end of the shank or body to roll or fold downwardly or backwardly upon itself. The shank or body is thus shortened and positively holds the disks or heads in the position to which they are forced and in which they grip the wall of the tire or article. While the shank or body is shortened by the pressure on the disks it is not collapsed or crushed between its ends and the metal is not bent in such a way as to cause it to lose its strength, so that the strength of the closure device is not impaired by the pressing together of the disks.

The two parts of the device can be readily drawn or stamped to the form shown, from sheet metal, by suitable dies which insures a high degree of accuracy and uniformity in the formation thereof. Consequently when the disk C is secured on the end of the shank against the shoulder $d$, the two heads will be exactly perpendicular to the shank and parallel and concentric to each other, so that when the device is compressed in applying it to the tire or other article the beads $b$ and $c$ will coincide exactly and insure a tight closure of the hole. The two parts are secured together in a press between suitable dies, and as there are but the two relatively large parts this work can be done rapidly by unskilled labor. By forming the shank or body D integral with the disk B there is no joint between these parts through which there can be any leakage of air, and consequently, if the riveted joint between the end of the shank or body and the head or disk C should leak, there would be no escape for the air between the shank or body and the other disk B and the device would still produce a perfect closure of the puncture or hole in the tire or article. The construction described furthermore insures the proper location of the disks B and C relatively to each other after the disks have been tightly pressed together, since the folding of the shank D and the shoulder $d$ takes place uniformly around the shank and prevents any radial movement of the shank relatively to the disk. The construction and manufacture of disks of this kind is thus greatly improved and simplified and a perfect closure of the hole is insured. By constructing the shank and the disk B in the manner described, so that the walls of the shank fold or roll back upon themselves, the device can be applied by a hand tool of the sort ordinarily employed with but little exertion, while nevertheless a strong grip of the disks or heads on the wall of the tire or article is insured, and the walls of the shank are not weakened, thus greatly lessening the danger of breaking the shank and thereby permitting the heads to become separated and to reopen the hole.

I claim as my invention:

1. A puncture closing device comprising two oppositely disposed parallel disks, one of said disks having an integral hollow shank portion projecting therefrom which is rigidly secured at its end to said other disk, said shank being adapted to extend through a hole in an article, and said disks being adapted to bear on opposite sides of said article around said hole, said shank being adapted to be rolled back upon itself by end pressure for shortening the shank and causing said disks to grip the article around said hole, substantially as set forth.

2. A puncture closing device comprising two oppositely disposed parallel disks, one of said disks having an integral hollow shank portion projecting therefrom and provided with an imperforate outer end, and said other disk having a hole in which the end of said shank portion is riveted, said shank being adapted to extend through a hole in an article and said disks being adapted to bear on opposite sides of said article around said hole, said shank being adapted to be rolled back upon itself by end pressure for shortening the shank and causing the disks to grip the article between them, substantially as set forth.

3. A puncture closing device comprising two oppositely disposed parallel disks, one of said disks having an integral hollow shank portion projecting therefrom and provided with a reduced outer end, and said other disk having a hole in which said reduced end of said shank is riveted, said shank and said first mentioned disk being adapted to be folded upon each other by end pressure on said disks, whereby said disks are caused to grip the wall of an article around a hole therein and to close said hole, substantially as set forth.

Witness my hand this 16th day of February, 1911.

CHARLES G. HORNUNG.

Witnesses:
C. W. PARKER,
A. L. MCGEE.

Copies of this patent may be obtained for five cents each, by addressing the "Commissioner of Patents, Washington, D. C."